UNITED STATES PATENT OFFICE.

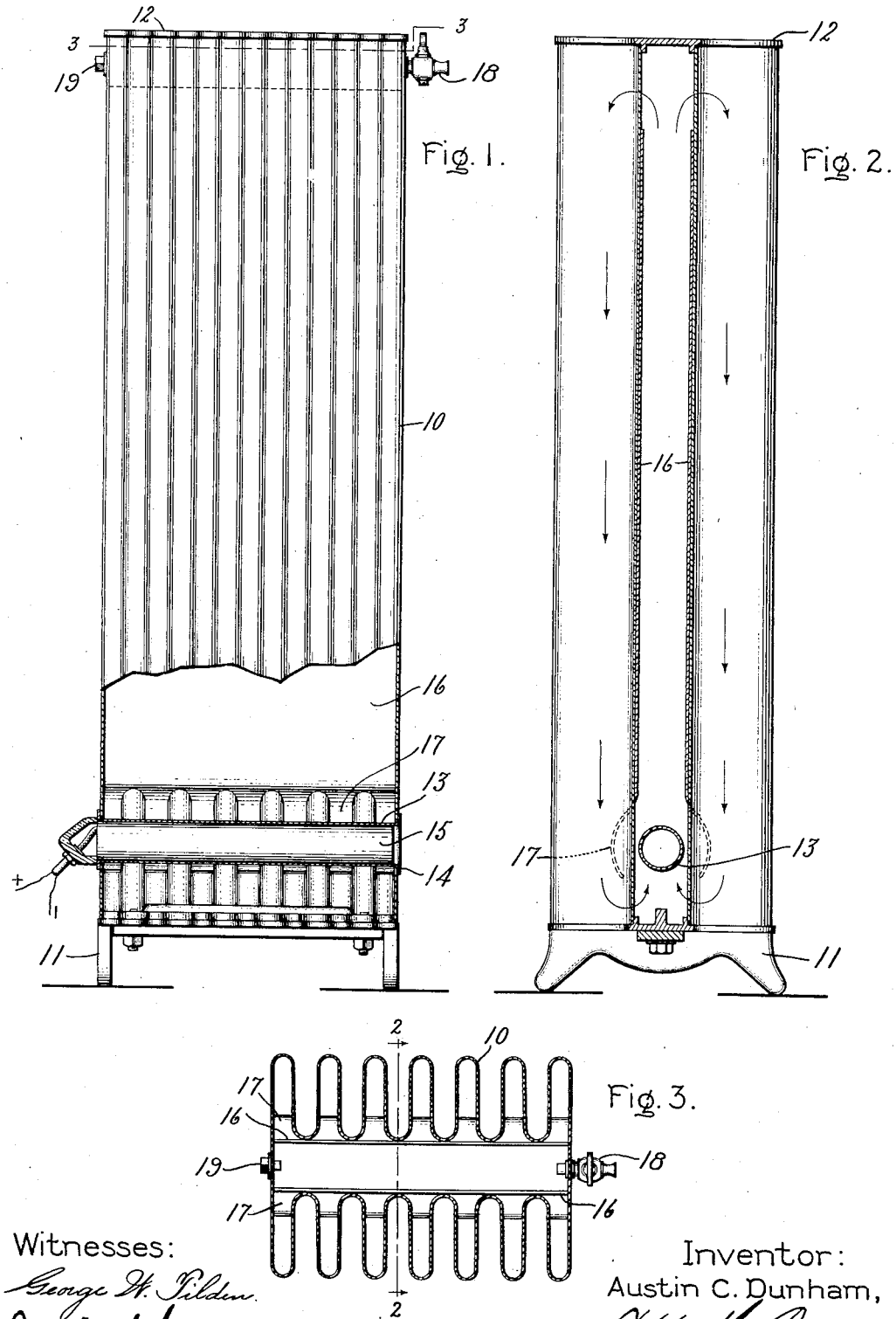

AUSTIN C. DUNHAM, OF HARTFORD, CONNECTICUT.

ELECTRIC HEATER.

No. 905,159.  Specification of Letters Patent.  Patented Dec. 1, 1908.

Application filed April 16, 1907. Serial No. 368,460.

*To all whom it may concern:*

Be it known that I, AUSTIN C. DUNHAM, a citizen of the United States, residing at Hartford, in the county of Hartford and State of Connecticut, have invented certain new and useful Improvements in Electric Heaters, of which the following is a specification.

This invention relates to electric heaters and has for its object the provision of a device of this character in which the energy of the electric current will be converted into heat and distributed in a safe and efficient manner.

My invention relates more specifically to electric heaters of the type used for warming the air of rooms. This type of heater requires a large radiating surface in proportion to the amount of heating surface, and it is one of the objects of my invention to supply a heater in which the radiating surface will distribute the heat uniformly and efficiently. In this form of heater a fluid, such as air, water, oil or the like, is caused to circulate within a closed casing thereby carrying the heat from the point at which it is generated throughout an extensive radiating surface.

My invention therefore consists in the features of construction and in the arrangement and combination of elements hereinafter set forth and particularly pointed out in the claims annexed to and forming a part of this specification.

In the accompanying drawings, Figure 1 is an elevation partly in section of one form of my invention; Fig. 2 is a sectional view taken on the line 2—2 of Fig. 3 looking in the direction of the arrow; and Fig. 3 is a sectional view taken on the line 3—3 of Fig. 1.

Referring to the drawings, 10 is a metallic casing made of sheet iron or any good heat conducting material. This casing is corrugated as shown in the drawings so as to approximate the form of a standard radiator. The particular form, however, of the casing is not of the essence of my invention, the main object being to secure a large radiating surface. This casing is mounted upon a base 11 and provided with a cap or cover 12, both of which may be of cast-iron. The corrugated casing is secured between the top and bottom castings in any desired way, as for instance by soldering, so as to give a water-tight joint. Extending from end to end at the bottom of the casing between the corrugated sides is a metallic tube, 13, the ends of which are flanged over the ends of the casing at 14 so as to make a tight joint. This tube is adapted to receive a heating unit 15, the particular form of which constitutes no part of my invention. I have found, however, that the unit disclosed in the patent to George E. Stevens, No. 803,795 serves the purpose very well, and for purposes of illustration I have shown my heater in connection with this unit. Other types of heating units may be used, however, without departing from the spirit of my invention. Arranged within the casing and adjacent to the inner ends of the corrugations are parallel plates 16 which extend throughout the length of the casing transversely of the corrugations. The plates, however, stop within a short distance of the top and bottom of the casing so as to cause the chamber formed by the plates 16 to communicate at the top and bottom with the lateral chambers formed by the corrugations. At the bottom the plates 16 are curved around the tube 13, as shown. In order to permit of this curvature of the plate, the latter is cut away so as to form strips or tongues 17 which fit in between the corrugations, as shown. At the top of the casing I provide an air valve or pet cock 18 and at 19 is a plug which may be removed for filling the casing.

The mode of operation of my device is as follows: The casing is filled with water, oil or the like to a point just below the cock 18 and an electric current is turned on to the unit 15 which will quickly rise in temperature. This will cause the water in the immediate vicinity of the unit and between the plates 16 to rise, the plates keeping the warm water and the cooler water separated. The water will thus rise and passing over the top of the plates on both sides will descend downward through the corrugations so as to replace the warm water which has gone upward in the central chamber. This will cause a circulation of water in the direction of the arrows, *i. e.* the water will pass upward through the central chamber and downward through the two sides, thus drawing the heat away from the heating unit and distributing it throughout a large radiating surface thereby causing a uniform temperature throughout the casing. I consider the arrangement of the plates 16 which operate as deflectors or baffle-plates an important part of my invention since they cause a perfect circulation throughout the casing by a very simple construction. By arranging the heating unit horizontally within the bottom of the central chamber the circulation is also greatly improved.

Many modifications of my invention will suggest themselves to those skilled in the art all of which are within the spirit of my invention in so far as they fall within the scope of the annexed claims.

What I claim as new and desire to secure by Letters Patent of the United States, is,

1. An electric heater comprising a fluid receptacle having a central chamber, a heating device within said chamber, and lateral chambers communicating with the central chamber at the upper and lower portions thereof.

2. An electric heater comprising a fluid receptacle having a central chamber, lateral chambers communicating therewith at the top and bottom, and an electric heating unit located horizontally within the bottom portion of said central chamber.

3. An electric heater comprising a corrugated fluid receptacle having a central casing dividing the receptacle into communicating chambers, and a heating device located within the bottom portion of said central casing.

4. An electric heater comprising a fluid receptacle having corrugated sides, a central casing therein dividing the receptacle into chambers communicating at the top and bottom thereof, and an electric heating unit located in the lower portion of said central casing and parallel with the sides.

5. An electric heater comprising a fluid receptacle having corrugated sides and parallel plates arranged within the casing adjacent to the corrugations so as to form a central chamber communicating with the lateral corrugated chambers at the top and bottom, and an electric heating unit arranged within the lower portion of the central chamber transversely of the corrugations.

6. In a heater, the combination with a vertical chamber, of a lateral vertical chamber communicating at its top and bottom with said vertical chamber, and a heating unit located within the walls of said vertical chamber.

7. In a heater, the combination with two or more vertical chambers communicating at their top and bottom to allow a gravity hot water circulation through said chambers, and a heating unit located in the path of said water circulation through said chambers.

8. A heater, comprising two or more vertical chambers, a heating unit within one of said chambers, said chambers having communicating openings at the upper and lower ends thereof, with the top of the lower communicating opening below the top of the heating unit.

9. A heater, comprising a single vertical chamber, a vertically corrugated side with the inward bends of the corrugations in contact with the side wall of said vertical chamber, thereby forming vertical chambers transverse to said single chamber, a heating unit in said single chamber, and with said wall of said single chamber provided with openings above and below said heating unit communicating with each of said transverse chambers.

10. A heater, comprising two or more vertical chambers, with a dividing wall between said chambers, said wall provided with openings between said chambers at the top and bottom of said chambers, a heating unit located at one side of the plane of said dividing wall, with said dividing wall extending to the top of said heating unit.

11. A heater, comprising two or more chambers, with a vertical dividing wall between said chambers, said wall provided with openings between said chambers at the top and bottom of said chambers, a heating unit located near the bottom of one of said chambers, with said vertical dividing wall opposite said heating unit bent outward and around said heating unit.

In witness whereof, I have hereunto set my hand this twelfth day of April, 1907.

AUSTIN C. DUNHAM.

Witnesses:
ERNEST S. NUTTING,
F. A. ISLEIB.